United States Patent [19]
Groves et al.

[11] Patent Number: 5,733,149
[45] Date of Patent: Mar. 31, 1998

[54] COMPUTER PERIPHERAL MODULE WITH KEYING ELEMENTS, MOLD AND METHOD OF MANUFACTURE

[75] Inventors: William R. Groves, Naperville; Roger W. Ady, Chicago, both of Ill.; Tim Courrier, Mesa, Ariz.

[73] Assignee: Motorola, Inc., Schaumburg, Ill.

[21] Appl. No.: 679,549

[22] Filed: Jul. 12, 1996

[51] Int. Cl.$^6$ ................................................ H01R 13/64

[52] U.S. Cl. ........................................ 439/680; 264/328.1

[58] Field of Search ................................ 439/680, 681, 439/633; 264/328.1; 425/542, DIG. 58

[56] References Cited

U.S. PATENT DOCUMENTS

| | | | |
|---|---|---|---|
| 5,122,052 | 6/1992 | Trame et al. | 425/DIG. 58 |
| 5,264,177 | 11/1993 | Goldstein et al. | 425/DIG. 58 |

Primary Examiner—Neil Abrams
Assistant Examiner—Yong Ki Kim
Attorney, Agent, or Firm—J. Ray Wood

[57] ABSTRACT

A computer peripheral module (10) having a rectangular outline with opposing ends (11, 12) and opposing sides (13, 14). The module has keying elements (19, 31) disposed on the sides, adjacent one end, for keying with a receiving slot in a predetermined orientation. One of the keying elements (31) has upper protruding lugs (32, 33, 34) and lower protruding lugs (36, 37, 38) The upper and lower protruding lugs are offset relative to each other in a direction parallel to the side (13).

8 Claims, 3 Drawing Sheets

5,733,149

1

COMPUTER PERIPHERAL MODULE WITH KEYING ELEMENTS, MOLD AND METHOD OF MANUFACTURE

FIELD OF THE INVENTION

This invention relates to a computer peripheral module, such as a peripheral module conforming to a Personal Computer Memory Card International Association (PCMCIA) standard having keying elements for insertion of the module into a receiving slot in a predetermined orientation and it relates to a mold and a method of manufacture of such a module.

BACKGROUND OF THE INVENTION

PCMCIA form factors have become de facto standards for computer peripherals such as memory, disk drives and modems. Even components which are designed to be permanently built into a host device typically abide by these form factors. The PCMCIA standard defines a 68-pin interface between the card and the socket or slot into which it is inserted. Included in the specification is the requirement for connector end keying, which prevents mismatched card and socket from being mated.

Current manufacturing and molding processes require complicated and costly construction, including mechanical core pulls in an injection mold. These core pulls require additional pieces (jibs, horn pin, slide, slide mirror, wear surface, lock block, wear plate, etc.) and provide associated complexities such as design, materials, and construction. These processes also require high maintenance and tuning and result in decreased part quality (variable flash, wear and lock position of slide). This in turn results in increase in variability in a critically toleranced area and decreased number of parts per molding cycle. Process variability is limited for example by limited gate placement around or near the slides.

There is a need for a simple method to provide keying elements in a computer peripheral module.

DETAILED DESCRIPTION OF THE DRAWINGS

Figure 1:
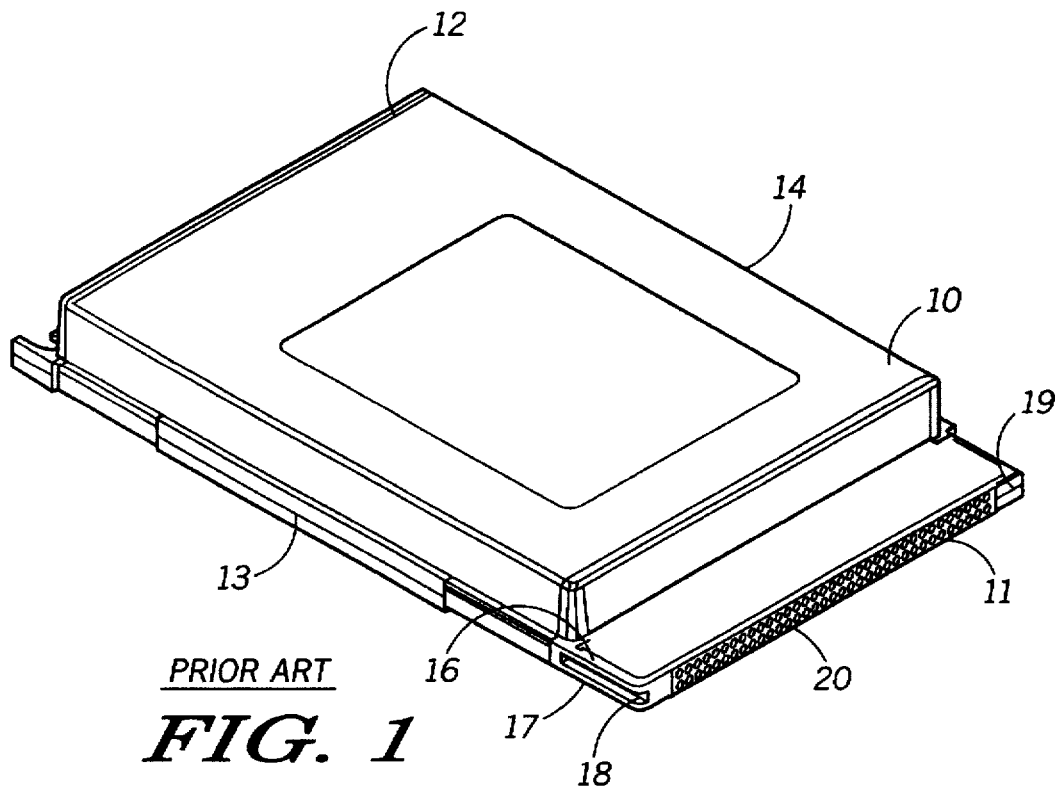
FIG. 1 is a perspective view of a prior art computer peripheral module conforming to the PCMCIA standard.

Referring to FIG. 1, a PCMCIA type III peripheral module 10 for a computer is shown having a rectangular outline and having a first end 11, a second end 12, a first side 13 and a second side 14. Disposed on the first side 13 adjacent the first end 11 of the module 10 is a keying element comprising an upper rail 16 and a lower rail 17. There is a groove 18 between the rails 16 and 17, parallel to the first side 13. Disposed on the second side 14 adjacent the first end 11 is a second keying element 19 in the form of an elongate rail extending parallel to the second side 14. The rail of the

2 second keying element 19 has approximately the same thickness as the rails 16 and 17 on the first side and is flush with the bottom of the module 10. The first end 11 of the module has a connector comprising 68 pin holes 20.

In use, the module is inserted into a receiving slot, with the holes 20 cooperating with corresponding pins located in the receiving slot. The function of the keying elements on the first and second sides of the module is to ensure that the module is inserted only in the correct orientation, thereby protecting the mechanical and electrical functioning of the connector. The rails 16 and 17 cooperate with a corresponding rail in the receiving slot which slides into the groove 18 between the rails 16 and 17. On the second side of the module, the rail of the keying element 19 slides into a corresponding groove in a corresponding keying element in the slot of the host receiving device.

Figure 2:
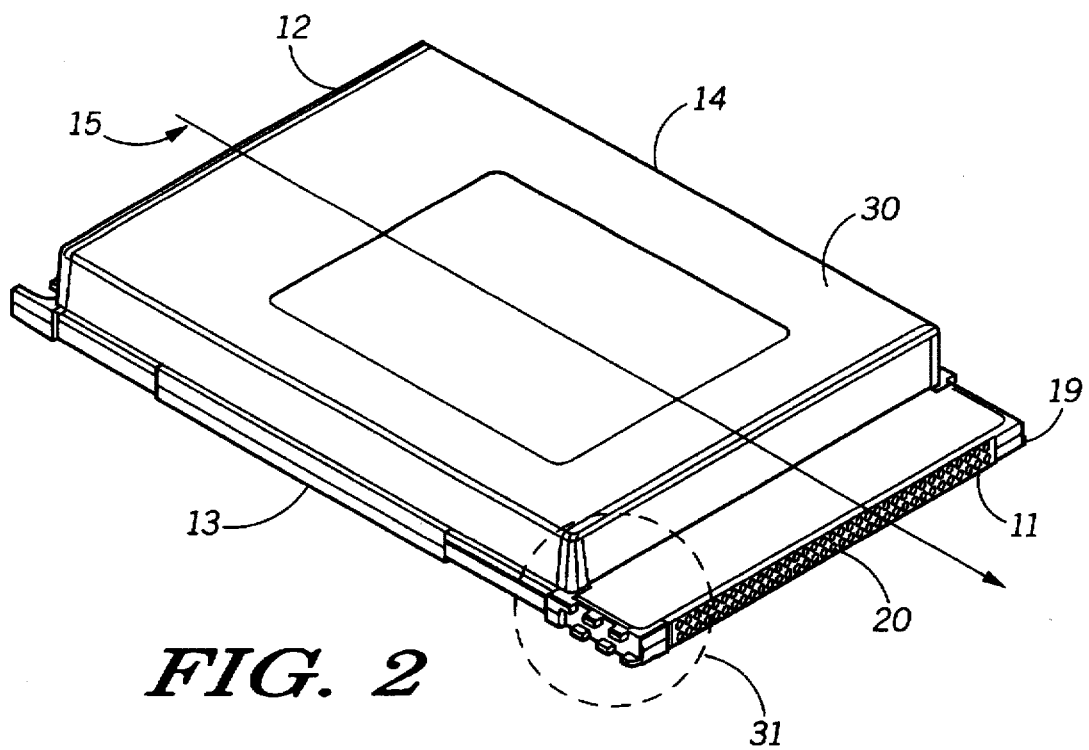
FIG. 2 is a perspective view of a computer peripheral module in accordance with the invention.

Referring to FIG. 2, a modified computer peripheral module 30 is shown, also conforming to the dimensions of the PCMCIA type III standard. It may be noted that the present invention is equally applicable to PCMCIA types I and II standards. An insertion axis 15 is illustrated by an arrow. This is the direction of insertion of the module into a corresponding receiving slot. The module 30 has a keying element 31 on the first side 13 near the first end 11 and a keying element 19 in the form of a rail on the second side near the first end 11. Details of the keying element 31 are illustrated in FIG. 3.

Figure 3:
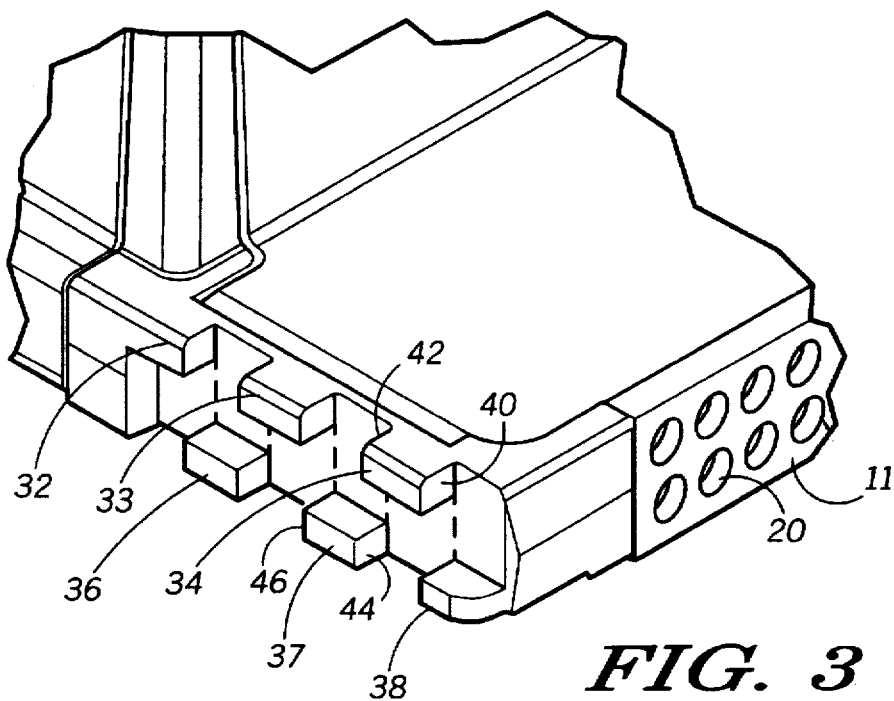
FIG. 3 is an enlargement of a keying element of the module of FIG. 2.

Referring to FIG. 3, it is illustrated that the first keying element disposed on the first side 13 of the module adjacent to the first end 11 comprises upper and lower protruding lugs. There are three upper protruding lugs 32, 33 and 34 and three lower protruding lugs 36, 37 and 38. The upper protruding lugs 32 to 34 are offset relative to the lower protruding lugs 36 to 38 in a direction parallel to the first side 13 (and parallel to the insertion axis 15). The upper lugs are arranged in a first row parallel to the first side and the lower lugs are arranged in a parallel second row below the first row and the upper and lower lugs are disposed in an alternating manner along the first and second rows.

Each of the lugs 33 to 37 has a forward edge and a trailing edge. For example, upper protruding lug 34 has a forward edge 40 and a trailing edge 42 and lower protruding lug 37 has a forward edge 44 and a trailing edge 46. The forward edge 44 of the lower protruding lug 37 is clear of the trailing edge 42 of the upper protruding lug 34 in a vertical direction. As a consequence, the lower protruding lug 37 can be molded using molding elements which extend downwardly between the upper lugs 33 and 34.

Upper protruding lug 32 has a forward edge but no trailing edge, because it is integrally molded with the first side 13 of the module. Lower protruding lug 38 has a trailing edge and also has a forward edge, the forward edge being an extension of the first end 11 of the module and being curved or beveled for ease of insertion into the slot.

It can be noted that the positions of the upper protruding lugs 32 to 34 and lower protruding lugs 36 to 38 can be reversed without detracting from the invention. That it to say, the forward-most lug adjacent the first end 11 can be an upper lug, followed in sequence by a lower lug, followed by an upper lug etc.

It may also be noted that there can be fewer lugs or more lugs. One upper lug and one lower lug is considered to be a minimum for successful insertion and unique keying.

It is preferred that the lug nearest the first end 11 is a lower lug, as this prevents even partial insertion in the reverse (incorrect) orientation.

One upper lug and two lower lugs or (in a less preferred embodiment) one lower lug and two upper lugs are alternative combinations. Other combinations can be devised.

Figure 4:
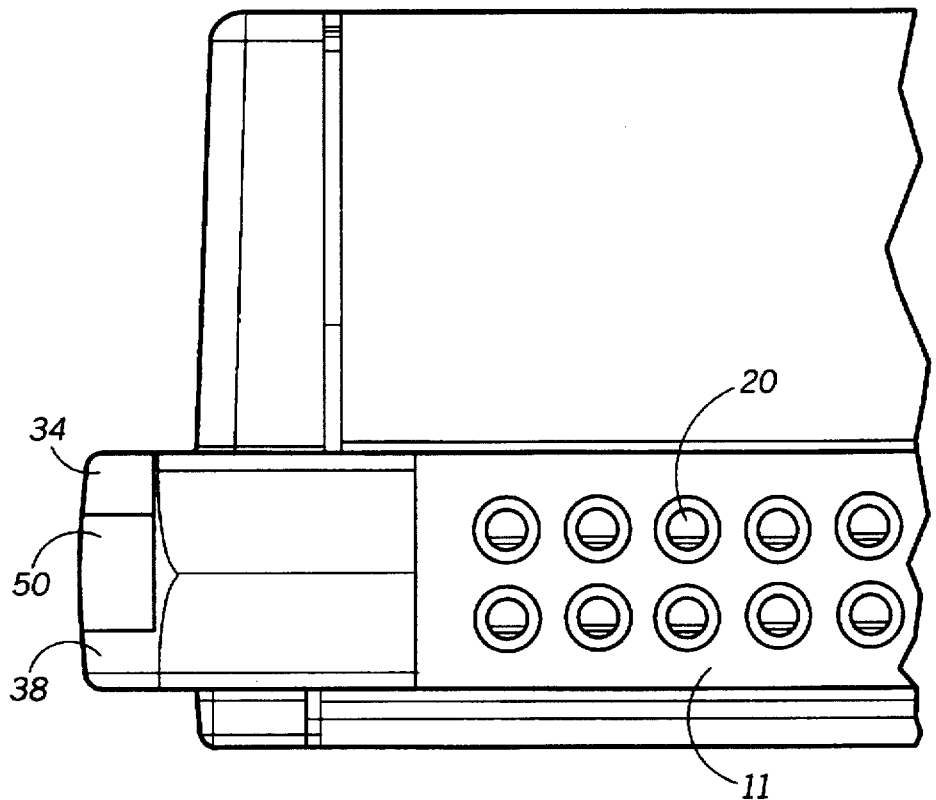
FIG. 4 is an end view of the portion of the computer peripheral module shown in FIG. 3.

Referring to FIG. 4, the elements of FIG. 3 are shown in end view and it can be seen that the upper protruding lugs and the lower protruding lugs (of which only lugs 34 and 38 respectively can be seen) define a groove 50 therebetween. The groove 50 cooperates with a corresponding rail in a host device (not shown) when the module is inserted into the host device for the pin holes 20 to receive corresponding pins in the host device.

Figure 5:
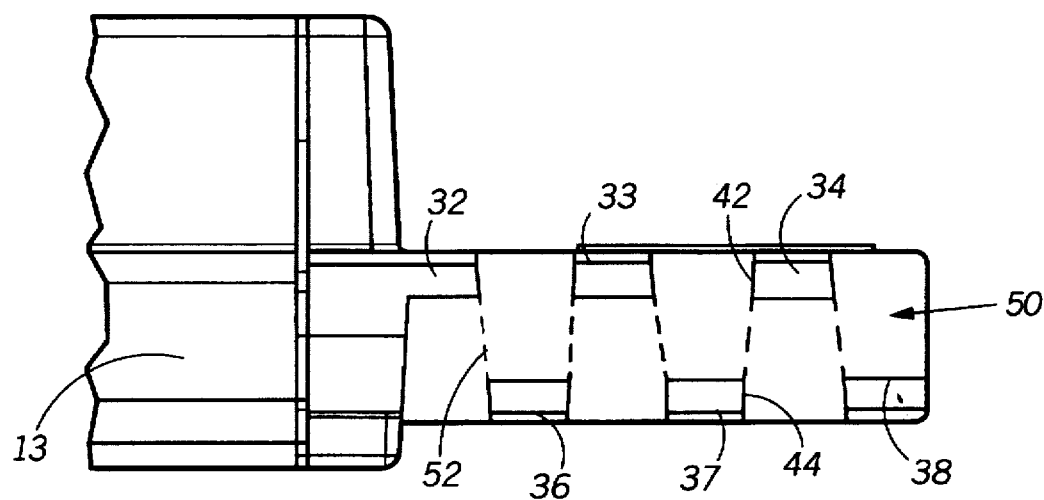
FIG. 5 is a side view of the portion of the computer peripheral module shown in FIG. 3.

Referring to FIG. 5, a side elevation view of the elements of FIG. 3 is provided, from which it can be seen that upper protruding lugs 32, 33, and 34 are offset relative to the lower protruding lugs 36, 37 and 38 in a direction parallel to the first side 13. Indeed, each lug is slightly tapered in a direction outwardly from groove 50, having a broader side facing inwardly, such that each trailing edge (e.g. edge 42 of lug 34) is positioned slightly forward of each immediately following forward edge (e.g. forward edge 44 of lug 37). This taper is referred to as "draft" in the art of plastics molding and avoids nagging when the mold is separated. It assists in the release of the part from the mold.

Figure 6:
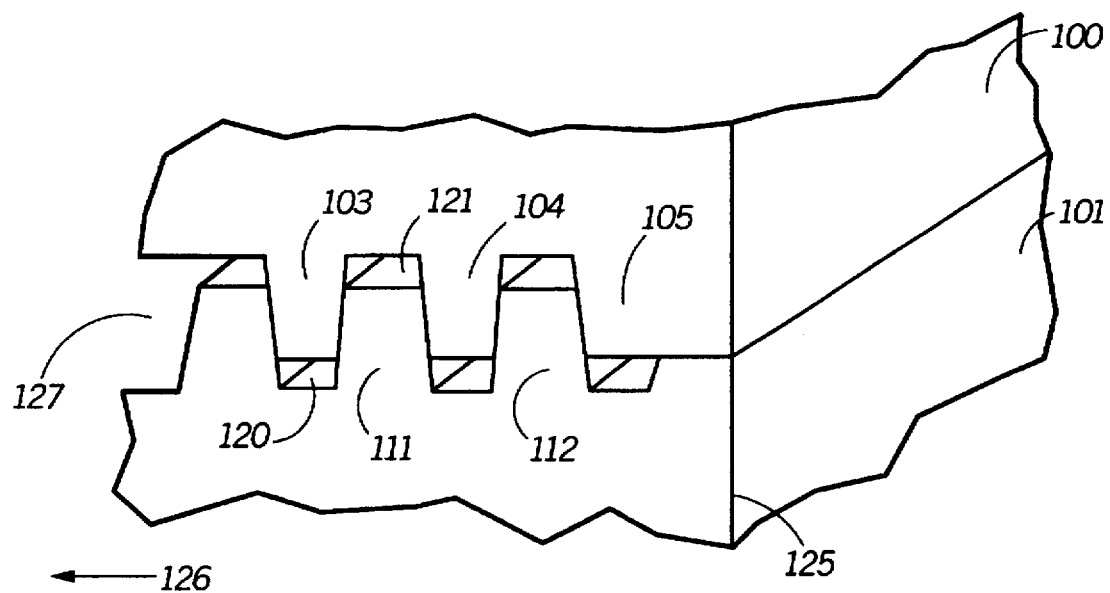
FIG. 6 is a cross section of a portion of a PCMCIA module mold for forming the features shown in FIG. 5.

Also illustrated in FIG. 5 and shown in phantom outline are molding webs 52, being inconsequential, but unavoidable webs of plastic formed in the process of molding of the keying elements. Referring to FIG. 6, a cross section of a portion of a PCMCIA module mold is shown, the section being taken through the keying element 31 and through the lugs 32–38. The mold forms the features illustrated in FIGS. 3 to 5. The mold comprises upper and lower halves 100 and 101. the mold has a first end 125 and a second end 126 (off the page). It has an elongate cavity 127 for forming the rail 13 of the PCMCIA module and other features standard to existing and known PCMCIA modules.

The upper half has three downwardly facing teeth 103, 104 and 105. The lower half 101 has three upwardly facing teeth 110, 111, and 112. The various teeth 103 to 105 and 110 to 112 are tapered outwardly from their respective molding halves 100, 101 from a broader base to a narrower end. When the molding halves are closed together as shown, the teeth 103 to 105 of the upper half 100 interlock with the teeth 110 to 112 of the lower half 101 and provide first and second molding interstices, e.g. interstices 120 and 121. These interstices receive plastic in an injection molding process and form the lower and upper protruding lugs 36 and 33 respectively illustrated in FIG. 5.

As a minimum, there are only two interstices in the portion of the mold illustrated, one upper interstice and one lower interstice, with the lower interstice being located nearer the end 125 of the mold and remote from the cavity 127 (when viewed from the end 125 with the teeth and interstices on the left-hand side).

Thus the computer peripheral module illustrated in FIG. 2 is manufactured by a method of which comprises molding keying elements disposed on the first side 13 of the module adjacent the first end 11 using a mold 100, 101 having interlocking teeth 103 to 112 which, when interlocked, provide first and second molding interstices 120, 121 offset relative to each other in a first direction parallel to the cavity 127 defining the first side 13 and offset relative to each other in a second direction perpendicular to the cavity defining the first side 13.

This method of manufacture is simple and inexpensive. The need for mechanical core pulls is eliminated and all of the problems associated with such complex molding arrangements are avoided. The molding halves 100 and 101 are able to define almost all of the features of the module in a single injection molding step. (Noting that the holes 20 of the connector cannot readily be molded in the same step, but also noting that such holes and such a connector are not essential in a module designed to be permanently built into a host device.)

We claim:

1. A computer peripheral module having a rectangular outline with first and second opposing ends and first and second opposing sides, the module comprising:

first and second keying elements disposed on the first and second opposing sides of the module respectively, adjacent the first end, for keying with a receiving slot in a predetermined orientation;

the first keying element comprising at least one upper protruding lug and at least one lower protruding lug, wherein the upper and lower protruding lugs are offset relative to each other in a direction parallel to the first side.

2. The computer peripheral module of claim 1 wherein the first keying element comprises at least two lower protruding lugs and at least one upper protruding lug, the upper protruding lug being located between the lower protruding lugs in the direction parallel to the first side.

3. The computer peripheral module of claim 1 wherein the first keying element comprises an equal number of upper and lower protruding lugs, the upper lugs being arranged in a first row parallel to the first side and the lower lugs being arranged in a parallel second row below the first row and the upper and lower lugs being disposed in an alternating manner along the first and second rows.

4. The computer peripheral module of claim 1 dimensioned to conform to a Personal Computer Memory Card International Association standard.

5. The computer peripheral module of claim 1 wherein the second keying element comprises a rail extending parallel to the second side.

6. A computer peripheral module having a rectangular outline with first and second opposing ends and first and second opposing sides, for insertion into a receiving aperture along an insertion axis parallel to the first and second opposing sides, the module comprising first and second keying elements disposed on the first and second opposing sides of the module respectively, adjacent the first end, for keying with the receiving aperture in a predetermined orientation; and the first keying element comprising first and second protruding lugs disposed on the first side of the module, spaced apart in a direction perpendicular to the insertion axis, wherein each of the first and second protruding lugs has a forward edge and a trailing edge, the forward edge of the first lug being clear of the trailing edge of the second lug in a direction perpendicular to the insertion axis.

7. A method of manufacture of a computer peripheral module having first and second ends and first and second sides, comprising molding keying elements disposed on the first side of the module adjacent the first end using a mold having interlocking teeth and recesses which, when interlocked, provide first and second molding interstices offset relative to each other in a first direction parallel to the first side and offset relative to each other in a second direction perpendicular to the first side.

8. A mold for molding a module shaped and dimensioned according to a Personal Computer Memory Card International Association standard, the mold comprising a first half and a second half and having an elongate cavity therebetween for defining at least a side of the module, the mold comprising first and second interlocking teeth which, when interlocked, define first and second molding interstices offset relative to each other in a first direction parallel to the elongate cavity defining the side and offset relative to each other in a second direction perpendicular to the elongate cavity defining the side.

* * * * *